UNITED STATES PATENT OFFICE.

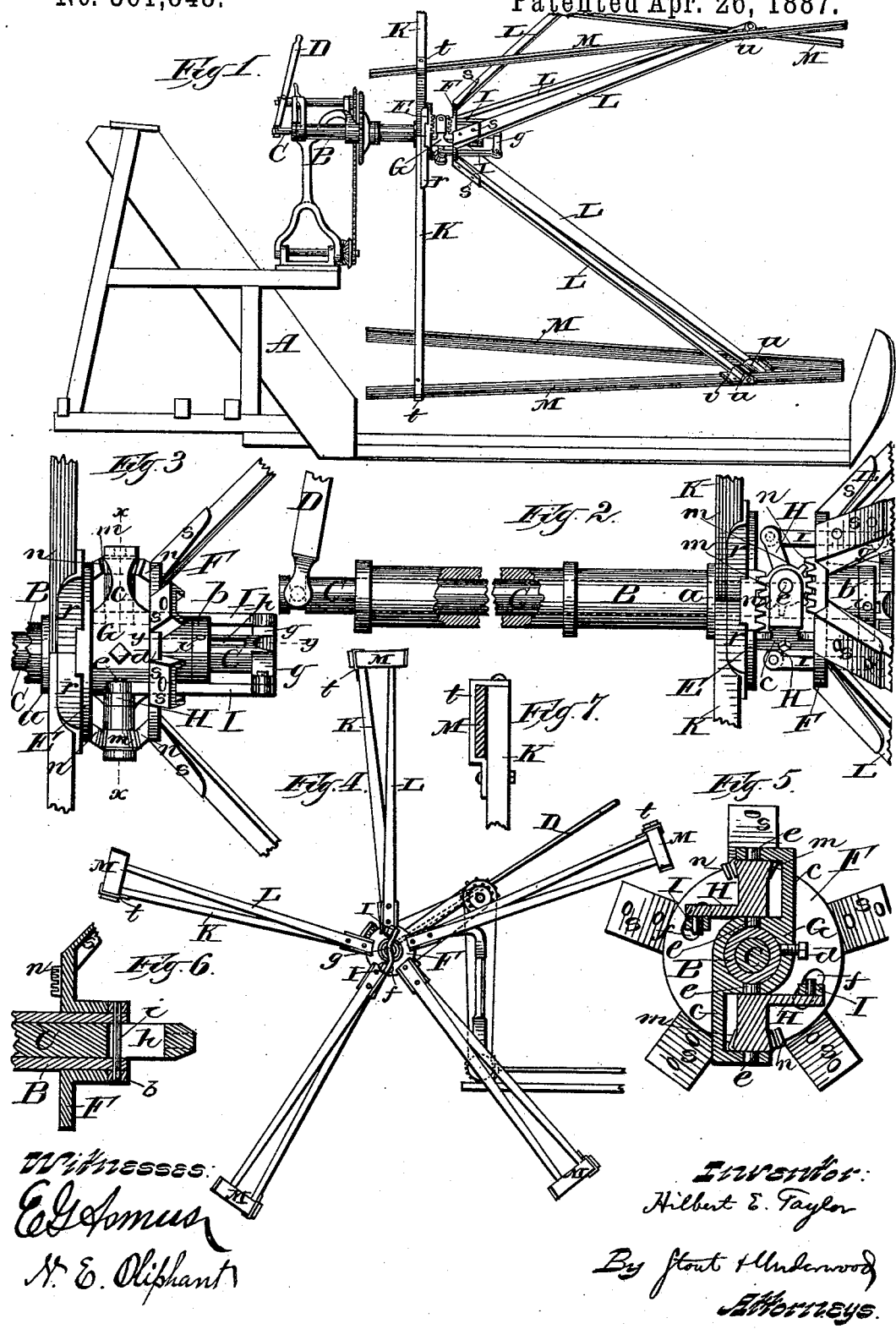

HILBERT E. TAYLOR, OF BLOOMINGTON, WISCONSIN, ASSIGNOR OF ONE-HALF TO NED JACCO, OF SAME PLACE.

HARVESTER-REEL.

SPECIFICATION forming part of Letters Patent No. 361,848, dated April 26, 1887.

Application filed June 19, 1886. Serial No. 205,616. (No model.)

*To all whom it may concern:*

Be it known that I, HILBERT E. TAYLOR, of Bloomington, in the county of Grant, and in the State of Wisconsin, have invented certain new and useful Improvements in Harvester-Reels; and I do hereby declare that the following is a full, clear, and exact description thereof.

My invention relates to that class of harvester-reels wherein the blades may be adjusted at an angle to the cutter-bar of the machine while in motion, in order to straighten such grain as may be storm-lodged or bent over by wind and other causes, thus causing it to fall squarely across the platform when cut.

My invention therefore consists in certain peculiarities of construction and arrangement of parts, as will be hereinafter described with reference to the accompanying drawings and subsequently claimed.

Figure 1 of the drawings represents a front elevation of my reel in operative position; Fig. 2, a plan view showing the means for operating the reel-blades; Fig. 3, a front view of the same; Fig. 4, an end view; Fig. 5, a vertical section on line $x \, x$, Fig. 3; Fig. 6, a horizontal section on line $y \, y$, Fig. 3; and Fig. 7, a detail showing the connection of the blades with the inner reel-arms.

Referring by letter to the drawings, A represents a portion of a harvester-frame to which my reel is operatively connected, the horizontal shaft B of said reel being tubular and hung in suitable bearings. Through this tubular shaft B extends a rod, C, that is connected at its inner end to a suitable shifting-lever, D, the latter designed to come within convenient reach of the operator of the machine. Loosely fitted on the shaft B are heads E F, held in place against an interposed block, G, by means of collars $a \, b$, this block being formed with radial right-angular extensions $c$, and made fast to said shaft by a set-screw, $d$, this construction being shown in detail, Fig. 5.

The block G and its extensions $c$ are provided with bearings for the trunnions $e$ of cranks H, that are pivotally connected to links I, the latter passing through suitable apertures, $f$, in the outer reel-head, F, and uniting with the respective ends of a cross-piece, $g$, that is centrally secured to the outer end of the rod C, thus forming a T-head to said rod. Instead of the cross-piece being secured to the rod, as above described, the outer end of the latter may be formed in one piece with wings that would serve the same purpose. Near its outer end the rod C is provided with a slot, $h$, and when this rod is acted upon by the lever D its play is limited by means of a pin, $i$, that passes through the collar $b$ and shaft B to engage said slot, as shown by Fig. 6. Each crank H, near the outer end, that is trunnioned to an extension, $c$, of the block G, is formed with toothed segments $m$, that mesh with similar segments, $n$, on the respective reel-heads E F, and thus, when the rod C is operated by the lever D, these heads are partially rotated on the shaft B in an opposite direction one to the other, this result being accomplished through the link-connection of said crank and rod.

Both reel-heads E F are provided with a series of radial sockets, those of the former being denoted by the letter $r$, while those of the latter are marked $s$ and cause the radial arms to stand at an angle to the face of the last-named head. In these sockets $r \, s$ are rigidly secured the inner ends of the reel-arms K L, respectively, their outer ends being loosely connected to blades or bats M, that come in contact with the grain when the machine is in operation.

The blades M are connected to the outer ends of the reel-arms K by means of angular straps $t$, secured to said arms by bolts or other suitable means, this construction being illustrated in detail, Fig. 7.

The reel-arms L are at an angle corresponding to that of the sockets $s$ on the head F, and have their outer ends loosely inserted in bearings $u$, that are secured near the outer extremities of the blades M, pins $v$ being passed through the ends of said bearings and into said ends of the arms, to thus form a pivotal connection between the parts. Supposing the several blades to be standing parallel to the cutter-bar of the machine, and it is desirable to place them at an angle thereto, the lever D is moved in or out, and through the intermediate mechanism described partially rotates the two reel-heads in opposite directions, this movement causing the inner and outer series of reel-arms to correspondingly change their positions and carry with them the respective loosely-connected ends of said blades, thus accomplishing the desired result without stopping the machine. When the lever is drawn in, the reel-blades will assume such an angle as to raise such grain as may be bent down in a direction away from the machine, while by pushing the lever out a reverse operation will be effected, this latter position being illustrated by Fig. 1.

By having both reel-heads loose on the shaft I am enabled to more readily adjust the blades with less friction than would be the case were one of the heads stationary, as it requires but one-half as much movement of the lever to throw said blades in a given direction.

Having thus fully described my invention, what I claim as new, and desire to secure by Letters Patent, is—

1. The combination, with a tubular reel-shaft, radial arms, and horizontal blades, of the two heads having loose bearings on the shaft and provided with toothed segments, a block having radial right-angular extensions and rigidly secured to said shaft between the heads, cranks trunnioned in the block and extensions thereof, and provided with toothed segments that mesh with those on said heads, and a sliding rod operative in the shaft and having a link-connection with the cranks, substantially as and for the purpose set forth.

2. The combination, with a tubular reel-shaft, radial arms, and horizontal blades, of the two heads provided with toothed segments and having loose bearings on the shaft, a block rigidly secured to said shaft between the heads and provided with radial right-angular extensions, cranks trunnioned in the block and extensions thereof, and provided with toothed segments that mesh with those on said heads, a sliding rod operative in the shaft and having its outer end provided with a cross-piece or equivalent thereof, and links uniting the latter with the cranks, substantially as and for the purpose set forth.

3. The combination, with a tubular reel-shaft, radial arms, and horizontal blades loosely connected to said arms, of the heads having loose bearings on the shaft, a block having radial right-angular extensions and rigidly secured to said shaft between the heads, cranks trunnioned in the block and extensions thereof, and provided with toothed segments that mesh with those on said heads, a slotted sliding rod operative in the shaft and having a link-connection with the cranks, and a pin that engages the slot in said rod, substantially as and for the purpose set forth.

4. The combination, with the reel-shaft, of two heads, each having a loose bearing on said shaft and each having radial sockets, reel-arms rigidly secured in said sockets, horizontal blades loosely connected to the outer ends of the reel-arms, and a lever and connecting mechanism for rotating said heads in opposite directions, as and for the purpose set forth.

In testimony that I claim the foregoing I have hereunto set my hand, at Bloomington, in the county of Grant and State of Wisconsin, in the presence of two witnesses.

HILBERT E. TAYLOR.

Witnesses:
P. BARTLEY,
M. F. WOODHOUSE.